(12) United States Patent
Nakajima (10) Patent No.: US 11,729,617 B2
(45) Date of Patent: Aug. 15, 2023

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/224,941

(22) Filed: Apr. 7, 2021

(65) Prior Publication Data

US 2021/0224495 A1 Jul. 22, 2021

Related U.S. Application Data

(63) Continuation of application No. 15/412,797, filed on Jan. 23, 2017, now abandoned.

(51) Int. Cl.
*H04L 29/06* (2006.01)
*H04W 12/069* (2021.01)
(Continued)

(52) U.S. Cl.
CPC ....... *H04W 12/069* (2021.01); *H04L 63/0823* (2013.01); *H04L 63/0884* (2013.01);
(Continued)

(58) Field of Classification Search
CPC ..... H04W 12/06; H04W 12/08; H04W 84/12; H04W 76/15; G06K 7/1413;
(Continued)

(56) References Cited

U.S. PATENT DOCUMENTS

| 8,243,693 B2* | 8/2012 | Khan | H04B 7/0615 370/335 |
| 2006/0031488 A1 | 2/2006 | Swales | |

(Continued)

FOREIGN PATENT DOCUMENTS

| JP | 2008-048145 A | 2/2008 |
| JP | 2009-141588 A | 6/2009 |

(Continued)

OTHER PUBLICATIONS

McCune, Jonathan M., et al., "Seeing-Is-Believing: Using Camera Phones for Human-Verifiable Authentication", Security and Privacy, 2005 IEEE Symposium, May 8, 2005, pp. 110-124 (Year: 2005).*

*Primary Examiner* — Sanchit K Sarker
(74) *Attorney, Agent, or Firm* — Canon U.S.A., Inc., IP Division (57) ABSTRACT

A communication apparatus executes an authentication process with a first other communication apparatus based on information acquired from an image obtained by capturing code information of the communication apparatus and receives, from the first other communication apparatus, first information shared between the first other communication apparatus and a second other communication apparatus. The communication apparatus transmits a search signal including second information based on the received first information and has a smaller amount of information than the first information, and transmits the first information to the second other communication apparatus in a case where a response signal in response to the search signal is received from the second other communication apparatus, and then executes a setting process for setting a communication parameter for communicating with the second other communication apparatus.

18 Claims, 7 Drawing Sheets

(51) Int. Cl.
  *H04L 9/40* (2022.01)
  *H04W 76/15* (2018.01)
  *G06K 7/14* (2006.01)
  *G06K 19/06* (2006.01)
  *H04W 84/12* (2009.01)

(52) U.S. Cl.
  CPC .......... *H04W 76/15* (2018.02); *G06K 7/1413* (2013.01); *G06K 7/1417* (2013.01); *G06K 19/06028* (2013.01); *G06K 19/06037* (2013.01); *H04W 84/12* (2013.01)

(58) Field of Classification Search
  CPC ....... G06K 19/06037; G06K 19/06028; G06K 7/1417; H04L 63/0823; H04L 63/0884
  See application file for complete search history.

(56) References Cited

U.S. PATENT DOCUMENTS

| | | | | |
|---|---|---|---|---|
| 2008/0010374 | A1* | 1/2008 | Lim | H04L 12/2809 709/225 |
| 2009/0028101 | A1* | 1/2009 | Kakumaru | H04W 12/08 370/329 |
| 2009/0294539 | A1* | 12/2009 | Kim | G06F 16/9554 235/462.01 |
| 2011/0096174 | A1 | 4/2011 | King et al. | |
| 2012/0008519 | A1* | 1/2012 | Katano | H04L 61/103 370/252 |
| 2012/0216044 | A1 | 8/2012 | Chung et al. | |
| 2012/0219007 | A1* | 8/2012 | Cho | H04L 12/2825 370/401 |
| 2013/0040665 | A1* | 2/2013 | Lee | H04W 4/029 455/457 |
| 2015/0325067 | A1* | 11/2015 | Lee | G07C 9/00174 340/5.65 |
| 2016/0360561 | A1* | 12/2016 | Lee | H04N 23/661 |

FOREIGN PATENT DOCUMENTS

| | | |
|---|---|---|
| JP | 2014-60623 A | 4/2014 |
| JP | 2015-220629 A | 12/2015 |
| WO | 2014/155844 A1 | 10/2014 |

\* cited by examiner

COMMUNICATION APPARATUS, COMMUNICATION METHOD, AND STORAGE MEDIUM

BACKGROUND

Field

The present disclosure relates to a communication technique.

Description of the Related Art

In order for a communication apparatus to connect to a wireless network and perform communication, it is necessary to set various communication parameters such as an encryption method, an encryption key, an authentication method, and an authentication key. Japanese Patent Application Laid-Open No. 2014-60623 discusses a technique for facilitating the setting of these communication parameters. In Japanese Patent Application Laid-Open No. 2014-60623, a communication apparatus displays a Quick Response (QR) Code® including information of a communication parameter. Then, the QR Code® is read by capturing the QR Code®, and the read communication parameter is set for an access point.

The Wireless Fidelity (Wi-Fi®) Alliance, which is an industry organization for a wireless local area network (LAN), has standardized a technique termed Wi-Fi Protected Setup™ (WPS), in which a communication parameter is automatically set between devices. Japanese Patent Application Laid-Open No. 2015-220629 discusses a technique for setting a communication parameter using WPS. In WPS, information for use in processing performed using WPS is transmitted by being added as an Information Element (hereinafter, an "IE") to a wireless LAN frame.

Japanese Patent Application Laid-Open No. 2014-60623 discusses setting a communication parameter using the capturing of code information that encodes a large amount of information, such as a two-dimensional code, whereby it is possible to reduce complicated input by a user.

It is possible to transmit information necessary to set a communication parameter using the capturing of code information by adding the information to a communication frame as in WPS. If, however, the information is transmitted by adding an information element to a communication frame, a wireless resource (band) can become limited.

For example, in a case where a search is performed for a desired communication partner apparatus, a communication frame to which information necessary to set a communication parameter is added is transmitted by broadcast. Then, a plurality of apparatuses receiving this communication frame can transmit response signals. In this case, if each apparatus transmitting a response signal also transmits a communication frame to which an information element is added, the wireless resource can become more limited.

Thus, in a case where information necessary to set a communication parameter using the capturing of code information is added to a communication frame, it is desirable that the information should have a smaller amount of information to reduce limiting the wireless resource.

SUMMARY

According to an aspect of an embodiment, a communication apparatus includes a first execution unit configured to, based on information acquired from a captured image corresponding to the communication apparatus, execute with a first other communication apparatus an authentication process for the first other communication apparatus to mediate wireless connection between the communication apparatus and a second other communication apparatus, a reception unit configured to, according to the authentication process executed by the first execution unit, receive, from the first other communication apparatus, first information for the wireless connection with the second other communication apparatus, a first transmission unit configured to transmit by broadcast a search signal including second information based on the received first information, has a smaller amount of information than the received first information, and is used to search for the second other communication apparatus, a second transmission unit configured to transmit by unicast the received first information to the second other communication apparatus in a case where a response signal in response to the search signal transmitted by the first transmission unit is received from the second other communication apparatus, and a second execution unit configured to, after the second transmission unit transmits the received first information, execute a setting process for setting a communication parameter for wirelessly connecting to the second other communication apparatus and communicating with the second other communication apparatus.

According to an aspect of an embodiment, a communication apparatus includes a first execution unit configured to, based on information acquired from a captured image corresponding to the communication apparatus, execute with a first other communication apparatus an authentication process for the first other communication apparatus to obtain authority to mediate wireless connection between the communication apparatus and a second other communication apparatus, an acquisition unit configured to, according to the authentication process executed by the first execution unit, acquire, from the first other communication apparatus, first information provided for the second other communication apparatus by the first other communication apparatus in a process in which the first other communication apparatus mediates the wireless connection between the communication apparatus and the second other communication apparatus, a reception unit configured to receive from the second other communication apparatus a search signal transmitted by broadcast and including second information based on the acquired first information, has a smaller amount of information than the acquired first information, and is used by the second other communication apparatus to search for the communication apparatus, a transmission unit configured to transmit a response signal to the second other communication apparatus, in a case where the reception unit receives the search signal including the second information, and a second execution unit configured to, in a case where the received first information is received by unicast from the second other communication apparatus after the response signal is transmitted by the transmission unit, execute a setting process for setting a communication parameter for wirelessly connecting to the second other communication apparatus and communicating with the second other communication apparatus.

Further features will become apparent from the following description of exemplary embodiments with reference to the attached drawings.

DESCRIPTION OF THE EMBODIMENTS

With reference to the drawings, a communication apparatus according to the present exemplary embodiment is described in detail below. A description is provided below of an example where a wireless local area network (LAN) system compliant with the Institute of Electrical and Electronics Engineers (IEEE) 802.11 series is used. The communication form, however, is not necessarily limited to a wireless LAN compliant with the IEEE 802.11 series. Alternatively, the present exemplary embodiment is also applicable to a communication apparatus compliant with another wireless communication method such as Bluetooth®, near field communication (NFC), or ZigBee. Yet alternatively, the present exemplary embodiment is also applicable to a communication apparatus compliant with a wired communication method such as a wired LAN.

Figure 1:
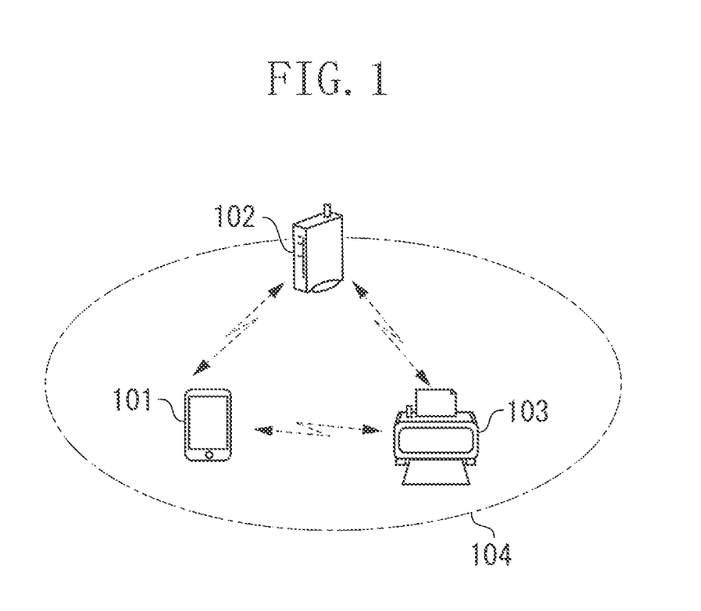
FIG. 1 is a diagram illustrating a configuration of a communication system according to the present exemplary embodiment.

FIG. 1 illustrates a configuration of a communication system according to the present exemplary embodiment. FIG. 1 illustrates a smartphone 101 and an access point (hereinafter, "AP") 102, which is a base station. FIG. 1 also illustrates a printer 103 and a wireless network 104, which is formed between the apparatuses in this communication system. In the present exemplary embodiment, the wireless network 104 illustrated in FIG. 1 is a wireless LAN compliant with the IEEE 802.11 series. The wireless network 104 is a communication network formed by the AP 102.

In the present exemplary embodiment, the AP 102 operates as an access point in an infrastructure mode defined by the IEEE 802.11 standard. Further, each of the other apparatuses operates as a station (STA) in the infrastructure mode defined by the IEEE 802.11 standard. The description is provided based on the assumption that the apparatuses in the communication system according to the present exemplary embodiment are a smartphone and a printer. Alternatively, the apparatuses in the communication system can be other apparatuses such as a mobile phone, a personal computer (PC), a video camera, a smartwatch, a personal digital assistant (PDA), and a camera. Although the description is provided based on the assumption that the number of the apparatuses in the communication system is three, the number of the apparatuses can be two or four or more.

A description is provided below of a case where a communication parameter setting process for connecting the AP 102 and the printer 103 via a wireless LAN is executed via the smartphone 101. A communication parameter includes various wireless communication parameters for making a wireless connection and performing wireless communication in compliance with the IEEE 802.11 standard. That is, the communication parameter includes communication parameters necessary to perform wireless LAN communication, such as a Service Set Identifier (SSID) as a network identifier, an encryption method, a network key, an encryption key, an authentication method, and an authentication key. The communication parameter can also include a media access control (MAC) address, a passphrase, an Internet Protocol (IP) address for communicating on an IP layer, and information necessary for an upper service. The communication parameter can include any one or all of the above parameters.

Figure 2:
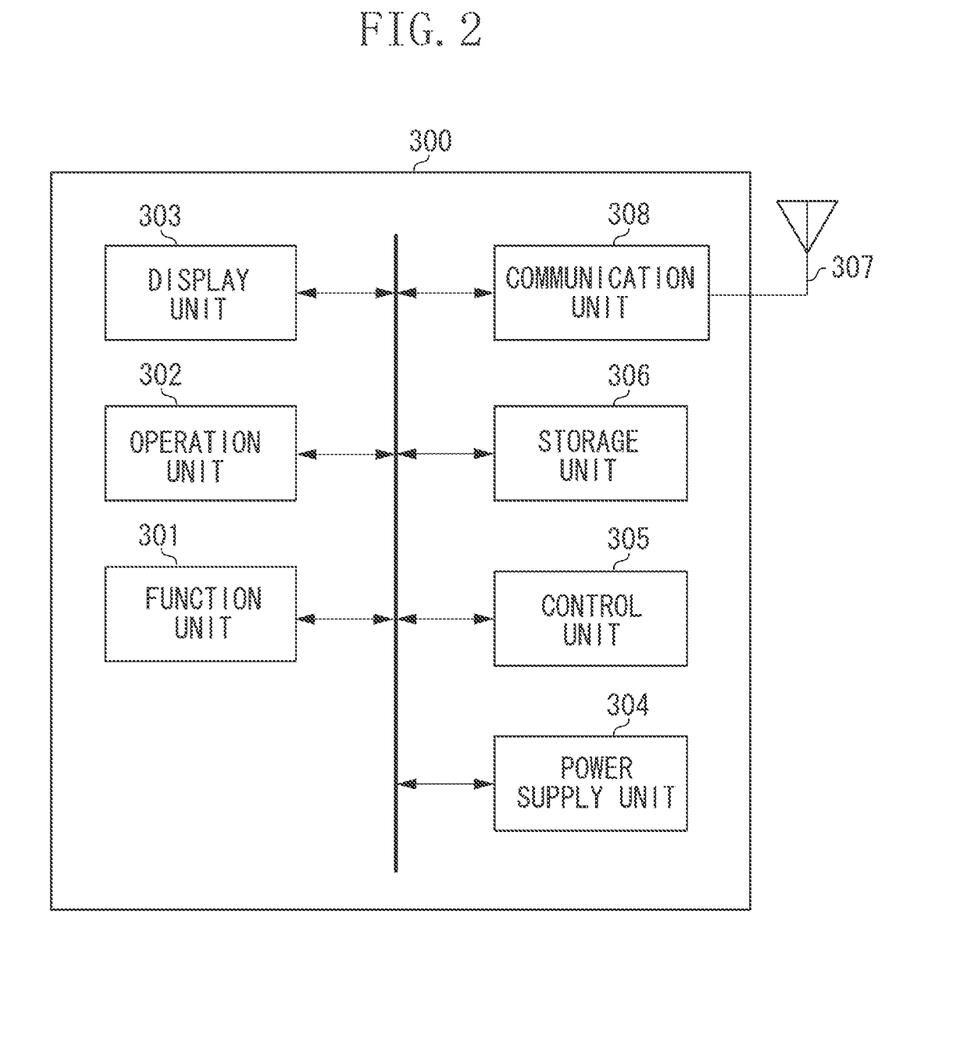
FIG. 2 is a diagram illustrating a configuration of a communication apparatus.

With reference to FIG. 2, a hardware configuration of each of the apparatuses (the smartphone 101, the AP 102, and the printer 103) in the communication system according to the present exemplary embodiment is described. FIG. 2 illustrates an entire apparatus 300. A function unit 301 is hardware for the communication apparatus 300 to execute predetermined processing. For example, in a case where the communication apparatus 300 is the smartphone 101, the function unit 301 is an image capture unit, includes an image sensor and a lens, and captures still moving images. For example, in a case where the communication apparatus 300 is the AP 102, the function unit 301 is a control processing unit for operating as a wireless LAN base station. For example, in a case where the communication apparatus 300 is the printer 103, the function unit 301 is a printing unit and performs a printing process.

An operation unit 302 enables a user to provide various inputs to operate the communication apparatus 300. The operation unit 302 stores a flag corresponding to an input in a memory such as a storage unit 306. A display unit 303 displays visually recognizable information and in some instances outputs sound. In a case where the display unit 303 displays visual information, the display unit 303 includes a video random-access memory (VRAM) for holding image data corresponding to the visual information to be displayed. The display unit 303 performs display control for continuing to display image data stored in the VRAM. A power supply unit 304 is for supplying power to each piece of hardware. The power supply unit 304 acquires power from, for example, a battery or an alternating current (AC) power supply.

A control unit 305 executes a control program stored in the storage unit 306, thereby controlling the entire apparatus. The control unit 305 includes a central processing unit (CPU) or a microprocessor unit (MPU). The control unit 305 can control the entire communication apparatus 300 in cooperation with an operating system (OS) executed by the control unit 305. The control unit 305 also performs control to communicate and share a communication parameter with another communication apparatus. Various operations described below are performed by the control unit 305 executing the control program stored in the storage unit 306.

The storage unit 306 stores various pieces of information such as a control program to be executed by the control unit 305 and information of a communication partner apparatus. The storage unit 306 includes a storage medium such as a hard disk drive (HDD), a flash memory, an attachable and detachable Secure Digital (SD) card, a read-only memory (ROM), or a random-access memory (RAM).

An antenna 307 is an antenna that communicates in the 2.4 GHz band and/or the 5 GHz band for performing wireless LAN communication. A communication unit 308 is hardware for performing wireless LAN communication compliant with the IEEE 802.11 series. The communication unit 308 includes a chip for performing wireless communication.

An operation of the communication system having the above configuration will now be described. The smartphone 101 performs with the AP 102 an authentication process, using the capturing of code information, for obtaining authority to operate as a management apparatus for mediating a process of setting a communication parameter for another apparatus. According to the authentication process with the AP 102, the smartphone 101 shares, with the AP 102, certification information certifying that the smartphone 101 is the management apparatus. Then, the smartphone 101 provides the printer 103 with the certification information using the capturing of code information. The printer 103 transmits search identification information based on the provided certification information by including the search identification information in a field determined in advance in a communication frame, and searches for the AP 102. Detecting the AP 102 according to the search, the printer 103 transmits certification information by unicast and connects to the wireless network 104 through a communication parameter setting process with the AP 102.

Figure 3:
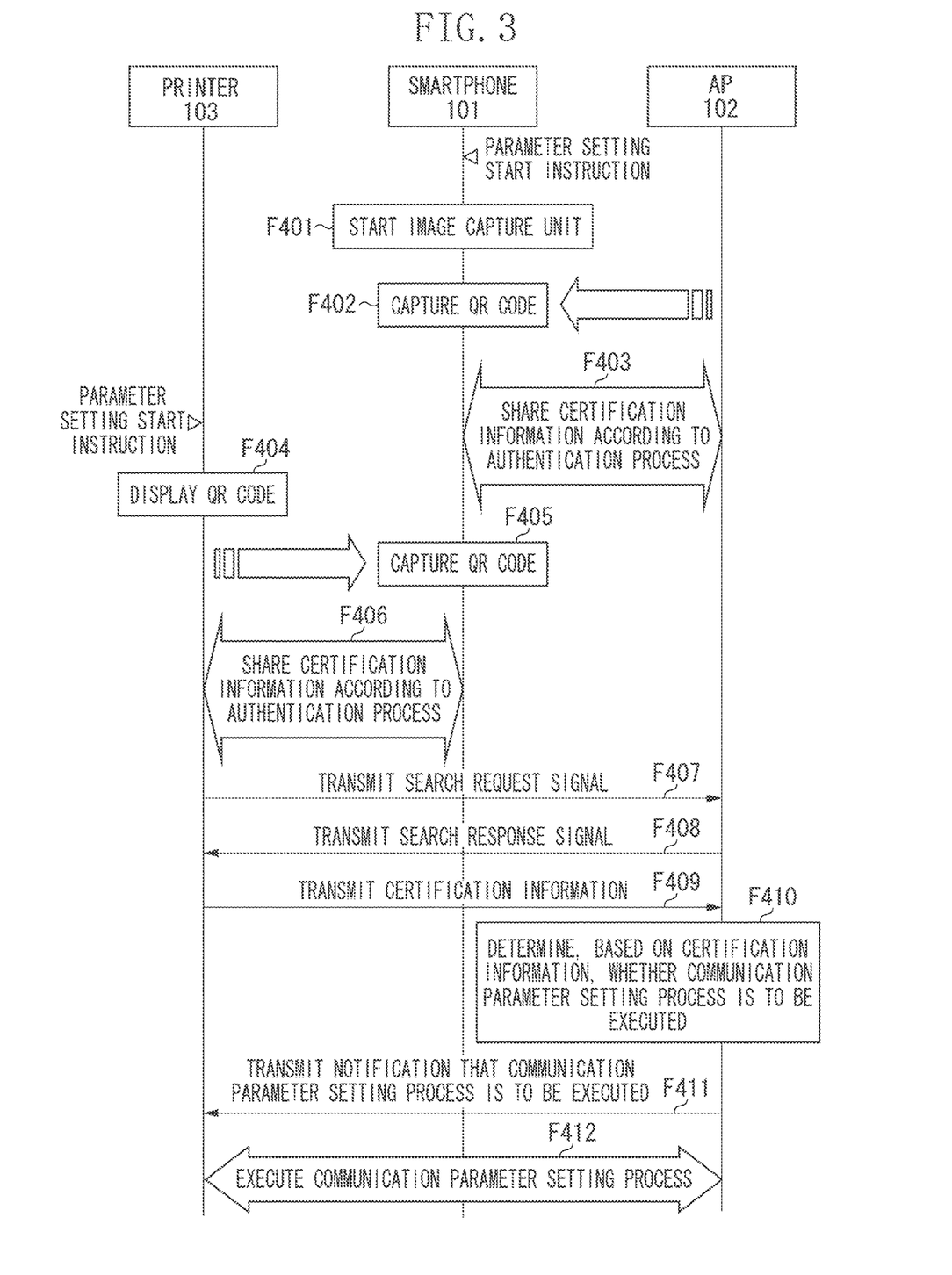
FIG. 3 is a diagram illustrating a sequence chart of the communication system.

With reference to a sequence chart illustrated in FIG. 3, an operation of the communication system according to the present exemplary embodiment is described. In FIG. 3, after receiving a process start instruction from the user, in F401, the smartphone 101 starts the function unit (image capture unit) 301. For example, the smartphone 101 can, on the display unit 303, display an instruction for the user to capture code information of an access point, such as "Please capture a QR Code® of an AP". A QR Code® of the AP 102 can be included on a label or sticker attached to AP 102 or in the AP's 102 instruction manual. It can also be displayed on AP's 102 display unit 303. That is, information for use in a communication parameter setting process is acquired from a captured image of code information corresponding to an apparatus, such as displayed code information or code information described on a label.

If the QR Code® is captured using the function unit (image capture unit) 301, then in F402, the smartphone 101 decodes the QR Code® based on the captured image. Although the description is provided on the assumption that code information to be captured is a QR Code®, another type of code information such as a barcode or a Computer Purpose (CP) code can be used.

In a case where information necessary for the communication parameter setting process is not included in the QR Code® captured and acquired in F402, the processing can end in an error.

The smartphone 101 acquires, as the information necessary for the communication parameter setting process from the code information, a public key and an identifier of the apparatus that are information for use in an authentication process. The identifier of the apparatus can be, for example, an MAC address or a universally unique identifier (UUID). Using the information for use in the authentication process obtained from the captured QR Code®, the smartphone 101 generates authentication information for use in the authentication process. At this time, the QR Code® includes information of a public key, and the smartphone 101 calculates a hash value for the public key, thereby obtaining the authentication information. A hash function used to generate the hash value can be SHA-1, SHA-2, or MD5.

In F403, the smartphone 101 generates authentication information and then starts the authentication process based on the generated authentication information. A signal to be exchanged in the authentication process can be communicated in the state of being encrypted using the Diffie-Hellman (DH) key exchange method or a public key encryption method. In the authentication process, the smartphone 101 transmits to the AP 102 an authentication request signal requesting an authentication process. At this time, the authentication request signal uses an action frame defined by the IEEE 802.11 series. The present exemplary embodiment, however, is not limited to this. Alternatively, an Extensible Authentication Protocol (EAP) signal can be used, or a wireless LAN packet such as a probe request other than an EAP signal can be used. This authentication request signal includes the generated authentication information. The authentication request signal can be transmitted by unicast, using the identifier of the apparatus obtained from the code information. Further, the authentication request signal can include, in addition to the authentication information, another piece of information for use in the authentication process, such as random numbers, an encryption key, e.g., a public key of the smartphone 101, or an apparatus name.

If receiving the authentication request signal, the AP 102 compares the authentication information included in the authentication request signal with authentication information generated based on a public key of the AP 102 itself, thereby performing authentication. If the authentication information included in the received authentication request signal matches the generated authentication information, authentication in the authentication process is successful. The AP 102 then transmits an authentication response signal indicating the authentication result.

The smartphone 101 waits for the authentication response signal including the result of the authentication process in the AP 102 and the authentication information generated by the AP 102. Upon receipt of the authentication response signal, the smartphone 101 performs authentication based on information included in the received authentication response signal. In this authentication, for example, authentication can be performed using a public key encryption method, and both apparatuses can share a common key that is the same encryption key. The smartphone 101 can perform authentication by determining whether the authentication information included in the received authentication response signal matches the generated authentication information. If the authentication information included in the received authentication response signal matches the generated authentication information, the authentication in the authentication process is successful. Further, the smartphone 101 transmits an authentication confirmation signal indicating the authentication result.

The smartphone 101 determines whether the authentication process is successful. If the authentication process is unsuccessful, the processing ends in an error. If the authentication process is successful, the smartphone 101 is in the state of, as a result of the successful authentication process, holding a shared key for use in the subsequent cryptographic communication, together with the AP 102.

If the authentication process ends, the smartphone 101 transmits to the AP 102 the authentication confirmation signal indicating the success or failure of the authentication process. If the authentication process is successful, the smartphone 101 shares, with the AP 102, the certification information certifying that the smartphone 101 obtains authority as a management apparatus. The sharing of the certification information can be performed by providing the AP 102 with information generated by the smartphone 101, or providing the smartphone 101 with information generated by the AP 102.

The certification information is encrypted using the common key shared in the authentication process. This can improve security for exchanging the certification information.

If the AP 102 acquires the certification information by the above processing, the AP 102 registers the smartphone 101 as the management apparatus of the network. The management apparatus is an apparatus having authority to mediate the setting of a communication parameter for another apparatus using the capturing of code information. That is, the apparatus successfully authenticated in the above authentication process with the AP 102 can obtain authority as the management apparatus.

The certification information shared between the apparatuses can include the public key of the smartphone 101 and/or the public key of the AP 102. The certification information can also include a communication parameter for communicating in the wireless network 104 formed by the AP 102. The certification information can also include channel information indicating a frequency band of the wireless network 104 formed by the AP 102.

The certification information can include identification information of the smartphone 101 and/or the AP 102. The certification information can include information for generating a communication parameter for communicating in the wireless network 104 formed by the AP 102. The certification information can include the authentication information for use in the above authentication process. The certification information can include the common key generated according to the above authentication process. The certification information can include identification information for the communication parameter setting process. The certification information can include priority information indicating the priority of the communication parameter setting process. The certification information can include identification information of the wireless network 104 formed by the AP 102.

Based on a communication parameter provided by the smartphone 101 in a case where the authentication process is successful, the AP 102 can form the wireless network 104.

The smartphone 101 and the AP 102 generate search identification information based on the certification information. The search identification information is, in a case where the management apparatus mediates the setting of a communication parameter for another apparatus using the capturing of code information, information used by another apparatus to search for an access point or a wireless network as a connection target. The search identification information can be uniquely and randomly generated based on the certification information. The search identification information can be generated by calculating a hash value for authentication information, using a hash function. The sharing of the search identification information can be performed by providing the AP 102 with information generated by the smartphone 101, or providing the smartphone 101 with information generated by the AP 102. Alternatively, the search identification information can be generated by each of the smartphone 101 and the AP 102.

Upon acquiring the certification information, the AP 102 stores the smartphone 101 as the management apparatus. The AP 102 registers the MAC address of the smartphone 101, the certification information, the authentication information, and/or the common key in association with each other in a management apparatus list.

A description will not be provided of an operation in which the smartphone 101, having obtained authority as the management apparatus, mediates a process of connecting the printer 103 to the wireless network 104. In F404, if instructed by the user to set a communication parameter, the printer 103 displays a QR Code® including information necessary to set the communication parameter.

If instructed by the user to set a communication parameter for another apparatus, the smartphone 101 starts the function unit (image capture unit) 301. After the process illustrated in F403 with the AP 102 ends, the smartphone 101 can automatically start the function unit (image capture unit) 301. In this case, the smartphone 101 can sequentially navigate the user to "Please capture a QR Code® of an AP" and "Please capture a QR Code® of a printer" on the display unit 303 of the smartphone 101.

In F405, the smartphone 101 captures the QR Code® displayed on the printer 103 and acquires, from the QR Code®, information necessary to set the communication parameter. Using the information obtained from the QR Code®, the smartphone 101 generates authentication information for use in an authentication process. The smartphone 101 performs the authentication process with the printer 103 based on the generated authentication information. If the authentication process is successful, then in F406, the smartphone 101 provides the printer 103 with the certification information shared with the AP 102. The authentication process in F406 is similar to the process described in F403.

If sharing the certification information, the smartphone 101 and the printer 103 also share search identification information. The smartphone 101 and the printer 103 share the search identification information shared between the smartphone 101 and the AP 102. The sharing of the search identification information can be performed by the smartphone 101 providing the printer 103 with the search identification information shared with the AP 102. Alternatively, the search identification information can be generated by the printer 103 based on the certification information. The search identification information has a smaller amount of information than the certification information.

After acquiring the search identification information and the certification information, in F407, the printer 103 transmits, by broadcast, a search request signal for searching for the AP 102 as a connection target. The search request signal transmitted in F407 includes the search identification information. The search request signal uses, for example, an action frame defined by the IEEE 802.11 series. The present exemplary example however, is not limited to this. Alternatively, an EAP signal can be used or a wireless LAN packet such as a probe request other than the EAP signal can be used.

The search identification information is transmitted by being included in a field determined in advance in a frame for use in communication. The search identification information is transmitted by, for example, being added to a field including the MAC address of the transmission destination or the transmission source. The MAC address is information using 48 bits. That is, if transmitted by being added to the field of the MAC address, the search identification information uses 48 bits. Thus, the amount of information is reduced as compared with a case where a dedicated IE indicating the communication parameter setting process used in the code information is added.

The search identification information can be transmitted by, for example, being added to a field including a Basic Service Set Identifier (BSSID) or an SSID as a network identifier. The BSSID uses 48 bits (6 octets), and the SSID uses 32 octets. Thus, if transmitted by being added to the field of the BSSID, the search identification information uses 48 bits (6 octets). Thus, the amount of information is reduced as compared with a case where a dedicated IE is added. If transmitted by being added to the field of the SSID, the search identification information uses 32 octets. Thus, the amount of information is reduced as compared with a case where a dedicated IE is added. The search identification information can be added to, for example, a field including a Homogeneous Extended Service Set Identifier (HESSID) defined by IEEE 802.11u. The HESSID uses 6 octets.

Upon receipt of the search request signal from the printer 103, the AP 102 acquires information added to the field including the search identification information. The AP 102 compares the information added to the field including the search identification information with the search identification information shared with the apparatus registered as the management apparatus. If the information added to the field including the search identification information matches the search identification information shared with the apparatus registered as the management apparatus, the AP 102 transmits a response signal. If the information added to the field including the search identification information does not match the search identification information shared with the apparatus registered as the management apparatus, the AP 102 does not transmit a response signal.

The response signal uses, for example, an action frame defined by the IEEE 802.11 series. The present exemplary embodiment however, is not limited to this. Alternatively, an EAP signal can be used or a wireless LAN packet such as a probe response other than the EAP signal can be used. The AP 102 transmits the response signal by adding the search identification information to a field including predetermined identification information such as an MAC address or a network identifier. As described above, a scanning process in a communication parameter setting process performed using the capturing of code information is executed by adding information indicating the scanning process to a field defined in advance in an existing communication frame in the state where the amount of information is reduced. Thus, it is not necessary to provide an IE, which leads to the addition of an amount of information, in information for use in the scanning process, and it is possible to detect a desired communication partner while increasing the availability of a wireless resource.

Since the information added to the field including the search identification information matches the search identification information shared with the smartphone 101 that is registered as the management apparatus, in F408, the AP 102 transmits a response signal.

That is, based on the search identification information, the AP 102 can determine whether the printer 103 is a target apparatus of the communication parameter setting process. Upon receipt of the response signal in response to the search request signal, the printer 103 extracts information from the field including the search identification information in the received response signal. The printer 103 determines whether the extracted information matches the search identification information included in the search request signal transmitted in F407. If the extracted information does not match the search identification information, the printer 103 can transmit a search request signal, or the processing can end in an error.

If the information extracted from the response signal matches the search identification information included in the search request signal transmitted in F407, then in F409, the printer 103 transmits the certification information by unicast to the AP 102 as the transmission source of the response signal. Upon receipt of the certification information, in F410, based on whether the certification information held in the AP 102 matches the received certification information, the AP 102 determines whether the communication parameter setting process is to be executed with the printer 103. If the certification information held in the AP 102 matches the received certification information, the AP 102 determines that the communication parameter setting process is to be executed. In the determination in F410, it can be determined whether the printer 103 can connect to the wireless network 104. Since the search identification information has an amount of information reduced from the certification information, it is determined, based on the certification information having a larger amount of information, whether the communication parameter setting process is to be executed, whereby it is possible to improve security. The certification information is exchanged by unicast, whereby it is possible to minimize the use of a wireless resource.

The AP 102 checks whether an apparatus indicated by administrator information included in the received certification information is the registered management apparatus. The AP 102 permits the connection of the transmission source of the certification information including the administrator information indicating the registered management apparatus, and does not permit the connection of the transmission source of a connection request signal including the administrator information indicating a management apparatus that is not registered. Further, the AP 102 executes the communication parameter setting process with the transmission source of the certification information including the administrator information indicating the registered management apparatus, and does not execute the communication parameter setting process with the transmission source of the certification information including the administrator information indicating a management apparatus that is not registered.

In F411, the AP 102 transmits, to the printer 103, a notification indicating the result of the determination in F410. The information transmitted in F411 can include the certification information. The notification in F411 indicates that the communication parameter setting process is to be executed.

In F412, the AP 102 and the printer 103 execute the communication parameter setting process, in which the apparatuses share a communication parameter for communicating in the wireless network 104. In F412, the AP 102 provides the communication parameter for the printer 103. The communication parameter setting process in F412 can be a 4-way handshake executed based on a pre-shared key included in the authentication information. In the communication parameter setting process in F412, both the AP 102 and the printer 103 can be encrypted by the encryption key shared according to the authentication process with the smartphone 101. The printer 103 is enabled to connect to the AP 102 based on the acquired communication parameter.

Figure 4:
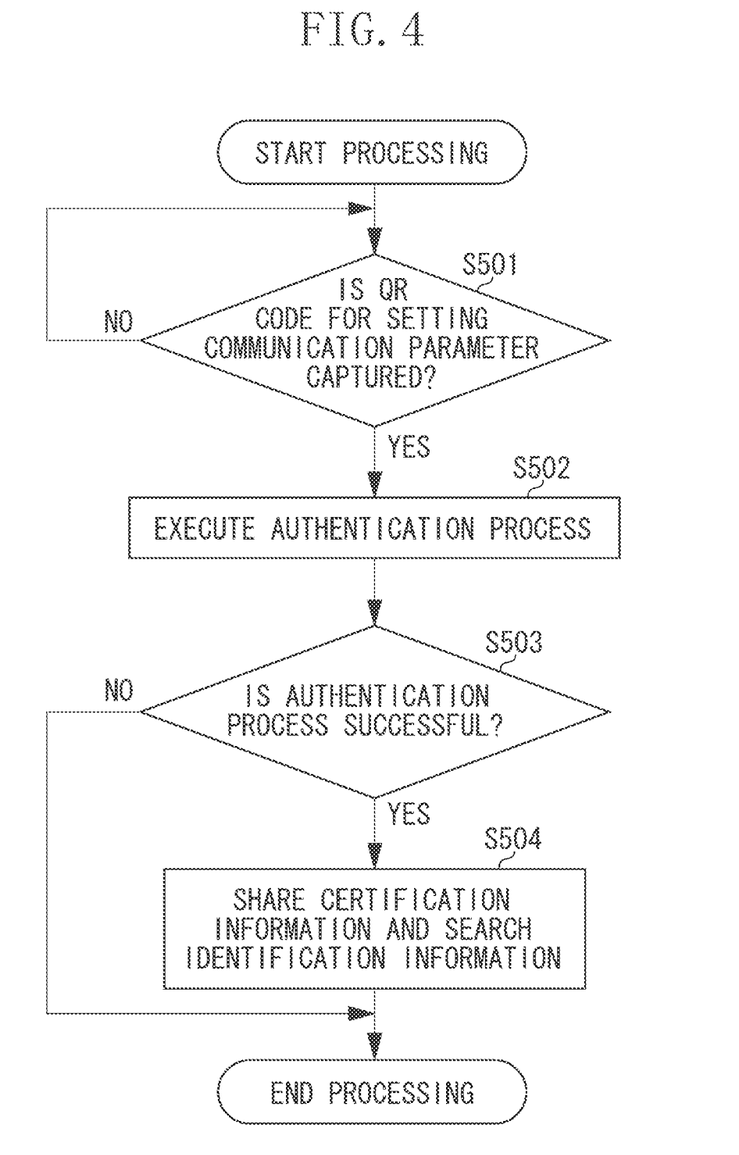
FIG. 4 is a flowchart illustrating a flow of processing of a smartphone.

With reference to a flowchart illustrated in FIG. 4, an operation of the smartphone 101 will be described. The flowchart in FIG. 4 is started after the user provides, through the operation unit 302, an instruction to start the setting of a communication parameter. The flowchart in FIG. 4 illustrates a flow of processing performed by the control unit 305 reading and executing a computer program stored in the storage unit 306. The configuration can be such that some or all of steps in the flowchart illustrated in FIG. 4 are achieved by hardware such as an application-specific integrated circuit (ASIC).

Upon receipt of an instruction to start processing, in step S501, the smartphone 101 captures a QR Code® using the function unit (image capture unit) 301 and decodes the captured QR Code®. Then, if the content of the captured QR Code® is information necessary to set a communication parameter (YES in step S501), the processing proceeds to step S502. If the captured QR Code® does not include information necessary to set a communication parameter (NO in step S501), the processing can end in an error. In this case, information regarding the failure causing the end in an error or format incompatibility can be indicated on the display unit 303.

In step S502, the smartphone 101 performs an authentication process based on information included in the QR Code®. The details of the authentication process are similar to the contents described in F403 and F406. In step S503, the smartphone 101 determines whether the authentication process in step S502 is successful. If the authentication process is unsuccessful (NO in step S503), the processing ends. If the authentication process is successful (YES in step S503), then in step S504, the smartphone 101 shares the certification information and the search identification information with a partner apparatus. The details of the process of step S504 are similar to the contents described in F403 and F406.

Figure 5:
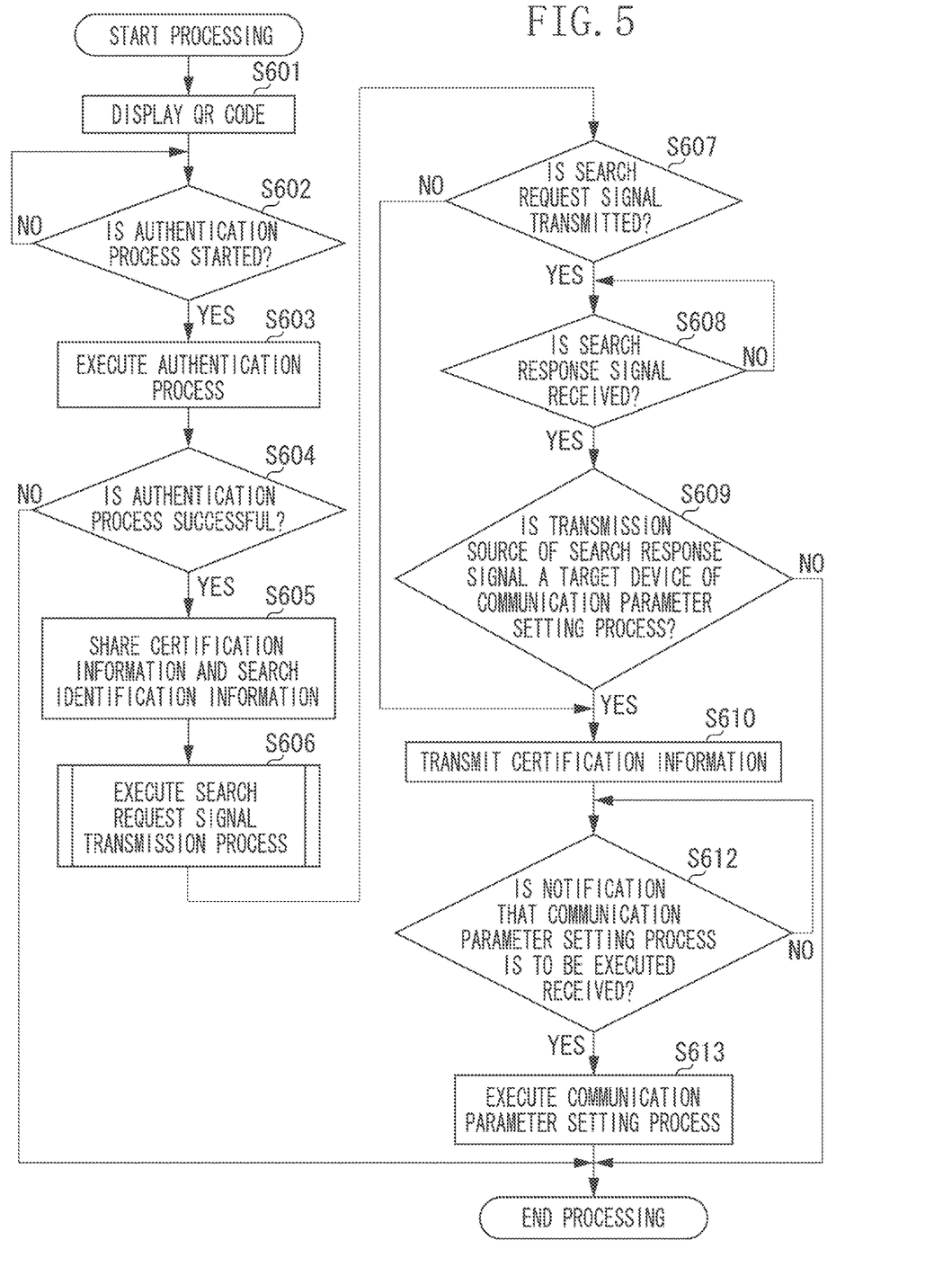
FIG. 5 is a flowchart illustrating a flow of processing of a printer.
Figure 6:
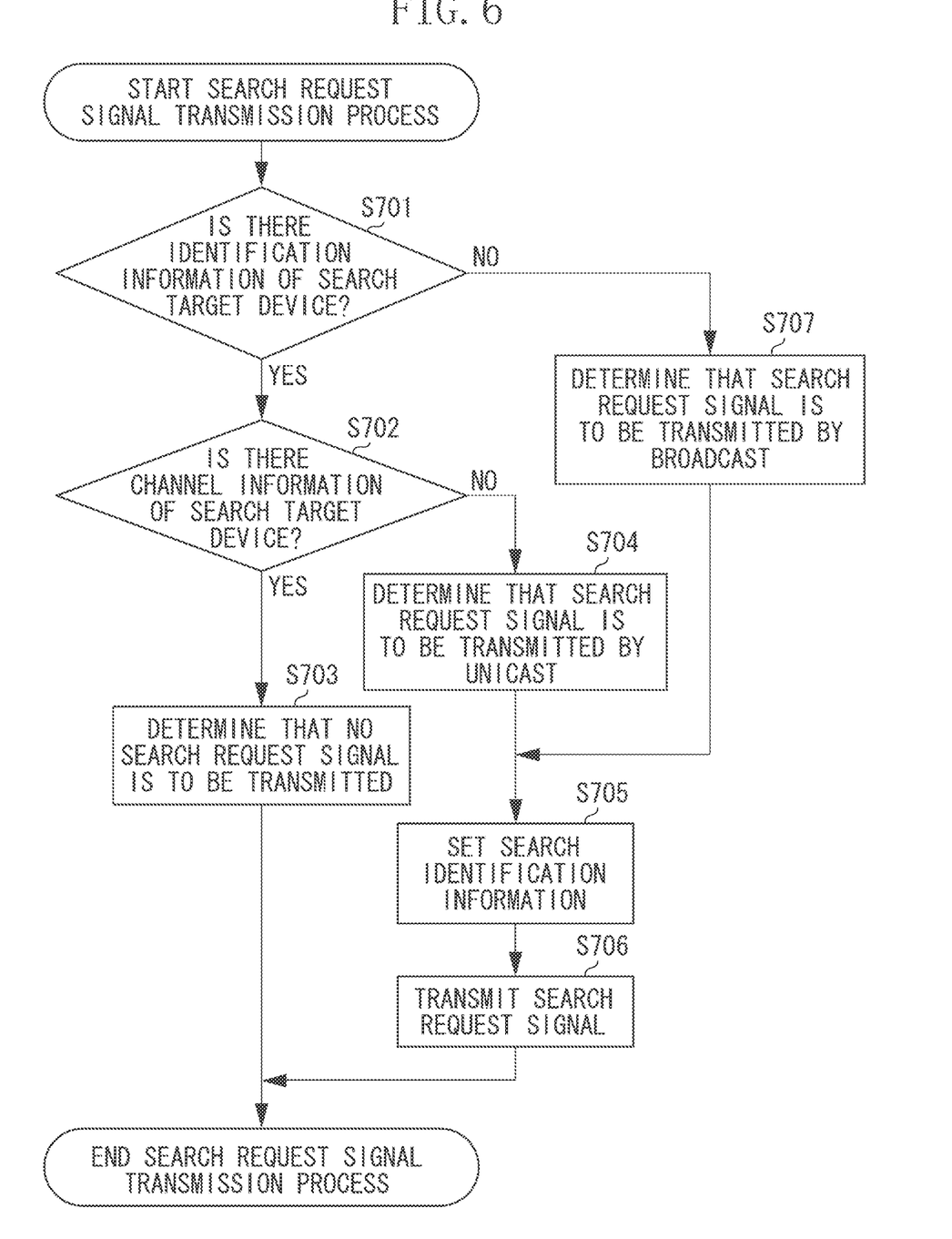
FIG. 6 is a flowchart illustrating a flow of a search request signal transmission process of the printer.

With reference to flowcharts illustrated in FIGS. 5 and 6, operations of the printer 103 will now be described. The flowchart in FIG. 5 is started after the user provides, through the operation unit 302, an instruction to start the setting of a communication parameter. The flowchart in FIG. 5 illustrates a flow of processing performed by the control unit 305 reading and executing a computer program stored in the storage unit 306. The configuration can be such that some or all of steps in the flowcharts illustrated in FIGS. 5 and 6 are achieved by hardware such as an ASIC.

Upon receipt of an instruction to start processing, in step S601, the printer 103 displays on the display unit 303 a QR Code® obtained by encoding information necessary for a communication parameter setting process. In step S602, the printer 103 determines whether an authentication process is started. If the authentication process is started (YES in step S602), then in steps S603 to S605, the printer 103 executes the process described in F406. If the authentication process is successful (YES in step S604), the apparatuses share the certification information and the search identification information. Then, in step S606, the printer 103 performs a process of transmitting a search request signal for searching for a communication apparatus or a wireless network as a connection target.

With reference to the flowchart illustrated in FIG. 6, the process of step S606 will now be described. In FIG. 6, in step S701, the printer 103 determines whether the printer 103 includes the identification information of a search target device. The case where the printer 103 includes the identification information of a search target device is a case where the printer 103 acquires the identification information of the search target device in the process of step S605. If the printer 103 includes the identification information of a search target device (YES in step S701), the processing proceeds to step S702. If the printer 103 does not include the identification information of a search target device (NO in step S701), the processing proceeds to step S707. Alternatively, if it is determined that the printer 103 includes the identification information of a search target device, the processing can proceed to step S704.

In step S702, the printer 103 determines whether the printer 103 includes channel information of the search target device. The case where the printer 103 includes the channel information is a case where the printer 103 acquires the channel information in the process of step S605, similarly to the identification information of the target device. If the printer 103 includes the channel information (YES in step S702), the processing proceeds to step S703. If the printer 103 does not includes the channel information (NO in step S702), the processing proceeds to step S704.

In step S703, since the printer 103 stores the identification information and the channel information of the search target device, the printer 103 can communicate with the search target device without executing a search process. Thus, the printer 103 determines that no search request signal is to be transmitted. Then, the search request signal transmission process ends. Even if the printer 103 stores the channel information in step S702, the processing can proceed to step S704. Then, the printer 103 can transmit a search request signal.

In step S704, the printer 103 determines that a search request signal is to be transmitted by unicast such that the destination is the identification information of the search target device. Then, the processing proceeds to step S705. In step S705, the printer 103 performs a process of including, in the search request signal, search identification information for determining whether the communication parameter setting process is to be executed with the search target device. Then, in step S706, the printer 103 transmits the search request signal.

In step S707, the printer 103 determines that a search request signal is to be transmitted by broadcast. Then, the processing proceeds to step S705. If the channel information is not acquired, the search request signal can be transmitted to all the channels. If the channel information is acquired, the search request signal can just be transmitted to a channel indicated by the channel information.

Alternatively, when it is determined in step S701 that the printer 103 includes the identification information of a target device, the processing can proceed to step S703. Then, the printer 103 can determine that no search request signal is to be transmitted. A search request signal can be transmitted by being encrypted by an encryption key acquired according to the authentication process.

Referring back to FIG. 5, in step S607, the printer 103 determines whether the search request signal is transmitted. If the search request signal is not transmitted (NO in step S607), the processing proceeds to step S610. If the search request signal is transmitted (YES in step S607), then in step S608, the printer 103 waits to receive a search response signal in response to the search request signal. If the search response signal is received (YES in step S608), then in step S609, the printer 103 determines whether the apparatus as the transmission source of the search response signal is a target device to be subjected to the communication parameter setting process. The determination in step S609 can be made based on the search identification information included in the search response signal.

If it is not determined that the transmission source of the search response signal is a target device to be subjected to the communication parameter setting process (NO in step S609), the processing ends. Alternatively, the printer 103 can perform the processes of step S606 and thereafter again.

If it is determined that the transmission source of the search response signal is a target device to be subjected to the communication parameter setting process, then in step S610, the printer 103 transmits by unicast the certification information acquired in step S605. In step S612, the printer 103 determines whether a notification that the communication parameter setting process is to be executed is received. Upon receipt of the notification that the communication parameter setting process is to be executed (YES in step S612), in step S613, the printer 103 executes the communication parameter setting process. Alternatively, based on the certification information included in the notification received in step S612, the printer 103 can determine whether the communication parameter setting process is to be executed. The details of the process of step S613 are similar to the content described in F412.

Figure 7:
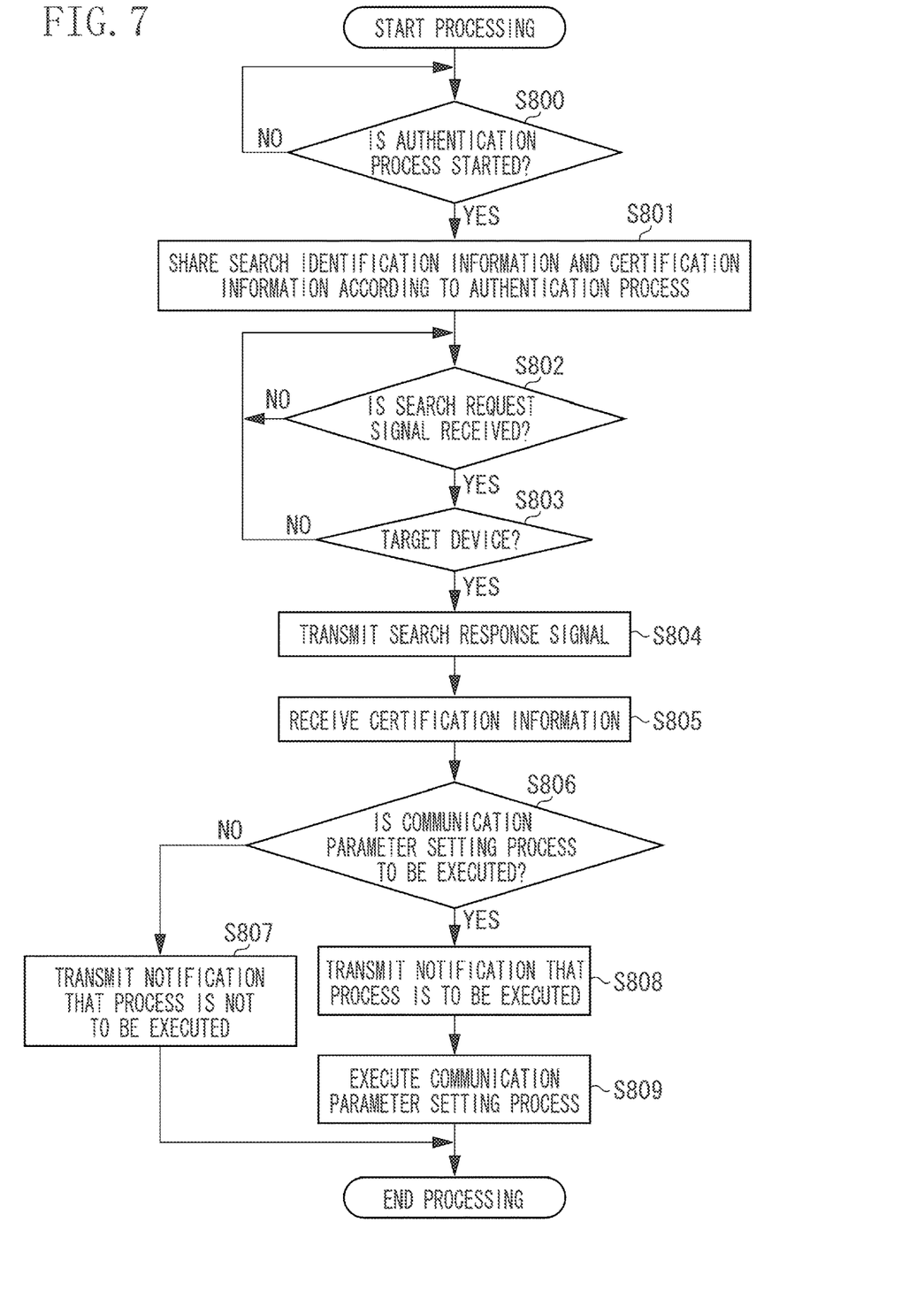
FIG. 7 is a flowchart illustrating a flow of processing of an access point.

With reference to a flowchart illustrated in FIG. 7, an operation of the AP 102 will now be described. The flowchart in FIG. 7 is started in a case where a signal requesting an authentication process is received by the AP 102. The flowchart in FIG. 7 illustrates a flow of processing performed by the control unit 305 reading and executing a computer program stored in the storage unit 306. The configuration can be such that some or all of steps in the flowchart illustrated in FIG. 7 are achieved by hardware such as an ASIC.

Upon receipt of a signal requesting an authentication process (YES in step S800), then in step S801, the AP 102 performs an authentication process with the transmission source of the signal and shares the authentication information and the search identification information with the transmission source. The process of step S801 is similar to the process described in F403. Then, in step S802, the AP 102 waits for a search request signal. Upon receipt of the search request signal (YES in step S802), in step S803, the AP 102 determines, based on whether the search identification information included in the search request signal matches the search identification information held in the AP 102, whether the transmission source of the signal is a target device of a communication parameter setting process. If it is determined that the transmission source of the signal is not the target device of the communication parameter setting process (NO in step S803), the AP 102 executes the processes of step S802 and thereafter again. If it is determined that the transmission source of the signal is the target device of the communication parameter setting process (YES in step S803), then in step S804, the AP 102 transmits a search response signal. The search response signal includes the search identification information.

In step S805, the AP 102 receives the certification information. In step S806, based on whether the received certification information matches the search identification information held in the AP 102, the AP 102 determines whether the communication parameter setting process is to be executed with the transmission source. In steps S807 and S808, the AP 102 transmits a notification indicating the determination result in step S806. The certification information can be added to the notification. If transmitting the notification that the communication parameter setting process is to be executed, then in step S809, the AP 102 executes the communication parameter setting process. The process of step S809 is similar to the process of the content described in F412.

As described above, according to the present exemplary embodiment, a scanning process in a communication parameter setting process performed using the capturing of code information is executed by adding information indicating the scanning process to a field defined in advance in an existing communication frame in the state where the amount of information is reduced. Thus, it is not necessary to provide an IE, which leads to the addition of an amount of information, in information for use in the scanning process, and it is possible to detect a desired communication partner while improving the availability of a wireless resource.

Since search identification information has an amount of information reduced from the certification information, it is determined, based on the certification information having a larger amount of information, whether the communication parameter setting process is to be executed, whereby it is possible to improve security. The certification information is exchanged by unicast, whereby it is possible to minimize the use of a wireless resource.

According to the present exemplary embodiment, the smartphone 101 provides each target apparatus with the search identification information for searching for a target apparatus of the communication parameter setting process, whereby it is possible to perform the parameter setting process by making effective use of a wireless resource.

In the present exemplary embodiment, a case has been described where information necessary for a communication parameter setting process is acquired from a QR Code®. The present exemplary embodiment however, is not limited to this. Alternatively, information necessary for a communication parameter setting process can be exchanged through secure proximity wireless communication such as NFC communication. In addition, the exchange between these apparatuses can be performed using communication other than wireless LAN communication, such as Bluetooth®. Wireless communication such as IEEE 802.11 or TransferJet® can also be used.

Information necessary for a communication parameter setting process can be exchanged through communication via a wireless local area network (WLAN), using a secure link or an action frame. At this time, the action frame itself can be encrypted. For the encryption, for example, any character string can be set between apparatuses, and then, the action frame can be encrypted based on information of the character string. At this time, the smartphone 101 and a target apparatus can exchange information of both apparatuses.

Displaying of a QR Code® is not limited to displaying on the display unit 303. Alternatively, for example, a QR Code® can be included in the form of a seal/sticker/label on a housing of a communication device, can be included in a communication device's instruction manual, or can be included on a packaging such as a corrugated fiberboard used to ship/sell a communication device. In addition to a QR Code®, another two-dimensional code such as a one-dimensional code, e.g., a barcode, or a CP code can be used. Instead of information in machine-readable format, such as a QR Code®, information in a format readable by a user can be used. The AP 102 or the printer 103 can include a function of a web server to display a QR Code® on a web page.

A case has been described where the apparatuses communicate with each other through wireless LAN communication compliant with the IEEE 802.11 standard. The present exemplary embodiment however, is not limited to this. Alternatively, the apparatuses can communicate with each other using a wireless communication medium such as wireless Universal Serial Bus (USB), MultiBand OFDM Alliance (MBOA), Bluetooth®, ultra-band (UWB), ZigBee, or NFC. UWB includes wireless USB, wireless 1394, and WiNET.

A description has been provided of processing in which the printer 103 sets a communication parameter for the AP 102. Alternatively, the smartphone 101 can set a communication parameter. In this case, the smartphone 101 includes a communication parameter for connecting to the AP 102, and the smartphone 101 and the printer 103 perform a communication parameter setting process. In this case, an opposing device on which the printer 103 performs the communication parameter setting process is the smartphone 101. This can be achieved by the smartphone 101 performing processing similar to the processing performed by the AP 102 in the present exemplary embodiment.

The smartphone 101 can perform a communication parameter setting process on the AP 102. This can be achieved by replacing the printer 103 and the AP 102 in the present exemplary embodiment with the AP 102 and the smartphone 101, respectively. The smartphone 101 generates a communication parameter for the AP 102, and the communication parameter is set for the AP 102 by the parameter setting process.

A case has been described where the AP 102 and the printer 103 connect to each other in the infrastructure mode of a wireless LAN. The present exemplary embodiment however, is not limited to this. Alternatively, for example, the AP 102 and the printer 103 can connect to each other in an ad hoc mode of a wireless LAN, or can connect to each other using Wi-Fi Direct®. When the smartphone 101 and the printer 103 include Wi-Fi Direct® connection functions, the apparatuses can connect to each other in a form of Wi-Fi Direct®. After the setting of a communication parameter is completed, either the smartphone 101 or the printer 103 operates as a Wi-Fi Direct® group owner and constructs a wireless network using a shared communication parameter. The other apparatus, which is not the group owner, connects as a Wi-Fi Direct® client to the group owner, whereby it is possible to establish a connection in the form of Wi-Fi Direct®.

According to the above description, information necessary to set a communication parameter using the capturing of code information is communicated in the state where the information has a smaller amount of information. Thus, it is possible to increase the availability of a wireless resource.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012864, filed Jan. 26, 2016, which is hereby incorporated by reference herein in its entirety.

What is claimed is:

1. A communication apparatus comprising:
   one or more processors; and
   one or more memories including instructions that, when executed by the one or more processors, cause the communication apparatus to:
   receive an authentication request including information regarding a public key from a first other communication apparatus;
   transmit an authentication response corresponding to the authentication request and according to a result of authentication based on the information regarding the public key to the first other communication apparatus;
   receive first information from the first other communication apparatus by communication in a case where the authentication is successful, wherein the first information is encrypted according to a first key, the first key being generated using at least the public key;
   transmit a search signal for searching for the second other communication apparatus by including the first information;
   receive response information which the second other communication apparatus responded in accordance with verification on the first information included in the search signal received by the second other communication;
   execute processing to set, based on at least the first information, an encryption key for connecting to a wireless network constructed by the second other communication apparatus in a case where the response information is received from the second other communication apparatus; and
   connect to the second other communication apparatus after setting the encryption key.

2. The communication apparatus according to claim 1, wherein the first information is generated by the first other communication apparatus.

3. The communication apparatus according to claim 1, wherein the encryption key is set between the communication apparatus the second other communication apparatus in the processing.

4. The communication apparatus according to claim 1, further comprising:
   a display unit configured to display an image including the information regarding the public key,
   wherein the authentication is executed based on the information regarding the public key included in the received authentication request.

5. The communication apparatus according to claim 4, wherein the display unit is configured to display an image including the information corresponding to the communication apparatus in a QR code.

6. The communication apparatus according to claim 1, wherein one or more processors further cause the communication apparatus to receive second information to be used for the processing to set the encryption key from the first other communication apparatus.

7. The communication apparatus according to claim 6, wherein an information amount of the first information is smaller than an information amount of the second information.

8. The communication apparatus according to claim 1, wherein the wireless network is compliant with the IEEE802.11 series standard.

9. The communication apparatus according to claim 1, wherein the first information is shared between the first other communication apparatus and the second other communication apparatus and the first information is used for verification to connect the wireless network constructed by the second other communication apparatus.

10. The communication apparatus according to claim 9, one or more processors further cause the communication apparatus to receive response information which the second other communication apparatus responded in accordance with verification on the first information included in the search signal received by the second other communication.

11. The communication apparatus according to claim 1, wherein the public key and the encryption key are used in the authentication.

12. The communication apparatus according to claim 4, wherein the information included in the image includes a MAC address of the communication apparatus and the authentication request in received by unicast at the MAC address.

13. The communication apparatus according to claim 1, wherein the transmission of the search signal is a unicast transmission.

14. The communication apparatus according to claim 1, wherein the communication apparatus is a printer and the second other communication apparatus is an access point.

15. The communication apparatus according to claim 1, the first information includes identification information on a network formed by the second other communication apparatus.

16. The communication apparatus according to claim 1, wherein the second other communication apparatus executes the authentication with the first other communication apparatus, and shares the first information with the first other communication apparatus in a case where the authentication succeeds.

17. A communication method comprising:
receiving an authentication request including information regarding a public key from a first other communication apparatus;
transmitting an authentication response corresponding to the authentication request and according to a result of authentication based on the information regarding the public key to the first other communication apparatus;
receiving first information from the first other communication apparatus by communication in a case where the authentication is successful wherein the first information is encrypted according to a first key, the first key being generated using at least the public key;
transmitting a search signal for searching for a second other communication apparatus by including the first information;
receiving response information which the second other communication apparatus responded in accordance with verification on the first information included in the search signal received by the second other communication;
executing processing to set, based on at least the first information, an encryption key for connecting to a wireless network constructed by the second other communication apparatus in a case where the response information is received from the second other communication apparatus; and
connecting to the second other communication apparatus after setting the encryption key.

18. A non-transitory computer-readable storage medium storing computer executable instructions for causing a computer to execute a method, the method comprising:
receiving an authentication request including information regarding a public key from a first other communication apparatus;
transmitting an authentication response corresponding to the authentication request and according to a result of authentication based on the information regarding the public key to the first other communication apparatus;
receiving first information from the first other communication apparatus by communication in a case where the authentication is successful, wherein the first information is encrypted according to a first key, the first key being generated using at least the public key;
transmitting a search signal for searching for a second other communication apparatus by including the first information;
receiving response information which the second other communication apparatus responded in accordance with verification on the first information included in the search signal received by the second other communication;
executing processing to set, based on at least the first information, an encryption key for connecting to a wireless network constructed by the second other communication apparatus in a case where the response information is received from the second other communication apparatus; and
connecting to the second other communication apparatus after setting the encryption key.

* * * * *